INVENTOR
DORMAN E. PRIEST
BY Roy A. Plant
ATTORNEY

Patented Dec. 9, 1952

2,620,655

UNITED STATES PATENT OFFICE 2,620,655

INSTRUMENT FOR RECORDING OR MEASURING THE SIZE AND SHAPE OF SURFACE IRREGULARITIES

Dorman E. Priest, North Lexington, Mass., assignor to Physicists Research Company, Ann Arbor, Mich.

Application October 8, 1949, Serial No. 120,328

20 Claims. (Cl. 73—105)

The present invention relates broadly to improvements in instruments for indicating or recording the sizes and shapes of surface irregularities, for example, irregularities of the surfaces obtained by various machining and finishing operations, and in its specific phases it relates to an instrument adapted for use in recording the profile of surfaces of that general character.

Considerable development work has been carried on in connection with electrical methods of measuring such quantities, and the greatest progress along this line has been made in measuring such quantities quite rapidly so that the electrical frequencies involved normally range from 10 cycles per second to several thousand cycles per second and upward. An important development in that field is covered by U. S. Patent No. 2,240,278 granted to Ernest J. Abbott. A fundamental limitation of the apparatus of that invention is that it will not measure static displacements or slow movements which are below the "low frequency cut-off" point of the assembly. Generally speaking, the present invention, which is a continuation-in-part of my co-pending patent application Ser. No. 555,942, filed September 27, 1944, now abandoned in favor of this application and application Ser. No. 120,329, filed October 8, 1949, is an improvement on the referred to invention of Ernest J. Abbott in that it makes possible both static and dynamic measurements of small dimensional changes or displacements, and so far as either static or dynamic measurements are concerned, it is not effected by "low frequency cut-off" conditions.

Others have devised specific methods of effecting electrical measurements of static displacements of one type or another, but each of those methods has specific limitations which interfere with, and reduce its usefulness, especially in the field of profile recording. For instance, variable condenser types of converters are necessarily high impedance devices and therefore subject to stray capacitance effects and pick-up. The use of two symmetrical coils, and a movable iron element whose movement will vary the inductance of one or both coils which are inserted in the arms of a bridge circuit, presents many difficulties, such as the need of identical units to insure initial balance of the bridge which, in turn, is subject to inaccuracy due to temperature variations, and also non-linearity when operated through the balance point. A fine wire has been substituted for balanced coil units in converters, wherein varied resistance of the wire is obtained by stressing it. This wire is also affected by temperature changes and the circuit itself is subject to the inherent bridge circuit balancing difficulties. Piezo-electric crystals have also been used in devices for making measurements of displacements. However, under static load the electric charge leaks off the surface of the stressed crystal in a short time and makes the readings based on same inaccurate. In addition, crystals are high impedance devices and in actual practice much difficulty is experienced with pick-up and stray capacitance effects. Another form of converter mechanism is one which utilizes a movable iron armature which affects a suitable pick-up coil or coils. This armature is mounted in the path of an alternating magnetic flux so that the amount of flux linking the pick-up coil or coils varies with the position of the armature relative to the field structure. In addition to electrical limitations of this type of apparatus, the moving iron element, in order for the apparatus to develop a useable sensitivity, must have substantial mass, and that in turn, means that its mechanical impedance is necessarily great. This not only limits its ability to follow high frequencies, but also requires sizeable operating forces even at low frequencies. In profile recording it is necessary to use tracer points of substantially less than 0.001" diameter, so that exceedingly minute operating forces must be used in order to avoid damage to the point, specimen, or both. It was a recognition of the shortcomings of this type of apparatus, as well as those of the other prior art constructions described above, and a knowledge of the need of a suitable apparatus for measuring or recording surface profiles, which led to the conception and development of the present invention. In particular, the present invention makes possible the recording of non-recurrent surface irregularities such as plateaus, steps, bows, and slopes, as well as long wave length irregularities classified as waviness, and also closely-spaced irregularities classified as roughness. Irregularities with spacings less than $\frac{1}{32}$" are classified as roughness, while those with spacings greater than $\frac{1}{32}$" are classified as waviness.

Accordingly, among the objects of the present invention is the production of a highly flexible and sensitive apparatus for measuring or recording the sizes and shapes of surface irregularities over a very wide range of spacings as well as heights.

Another object is to provide an apparatus for measuring or indicating dimensional characteristics of a surface wherein bridge circuits or moving iron armatures with their shortcomings are avoided.

Another object is to provide an apparatus where the moving parts are of light weight so as to have a low mechanical impedance.

Another object is to provide an electrical device including a converter, the output of which is instrinsically linear throughout its operating range, such range being pre-chosen and the elements of the assembly designed to handle that range.

Another object is to provide an apparatus adapted for use in indicating or recording surface profiles.

Still further objects and advantages will appear as the description proceeds.

To the accomplishment of the foregoing and related ends, the invention, then, consists of the mechanical-electrical means hereinafter fully described and particularly pointed out in the claims, the annexed drawings, and the following description setting forth in detail certain means for carrying out the invention, such disclosed means illustrating, however, but several of various ways in which the principle of the invention may be used.

Figure 1:
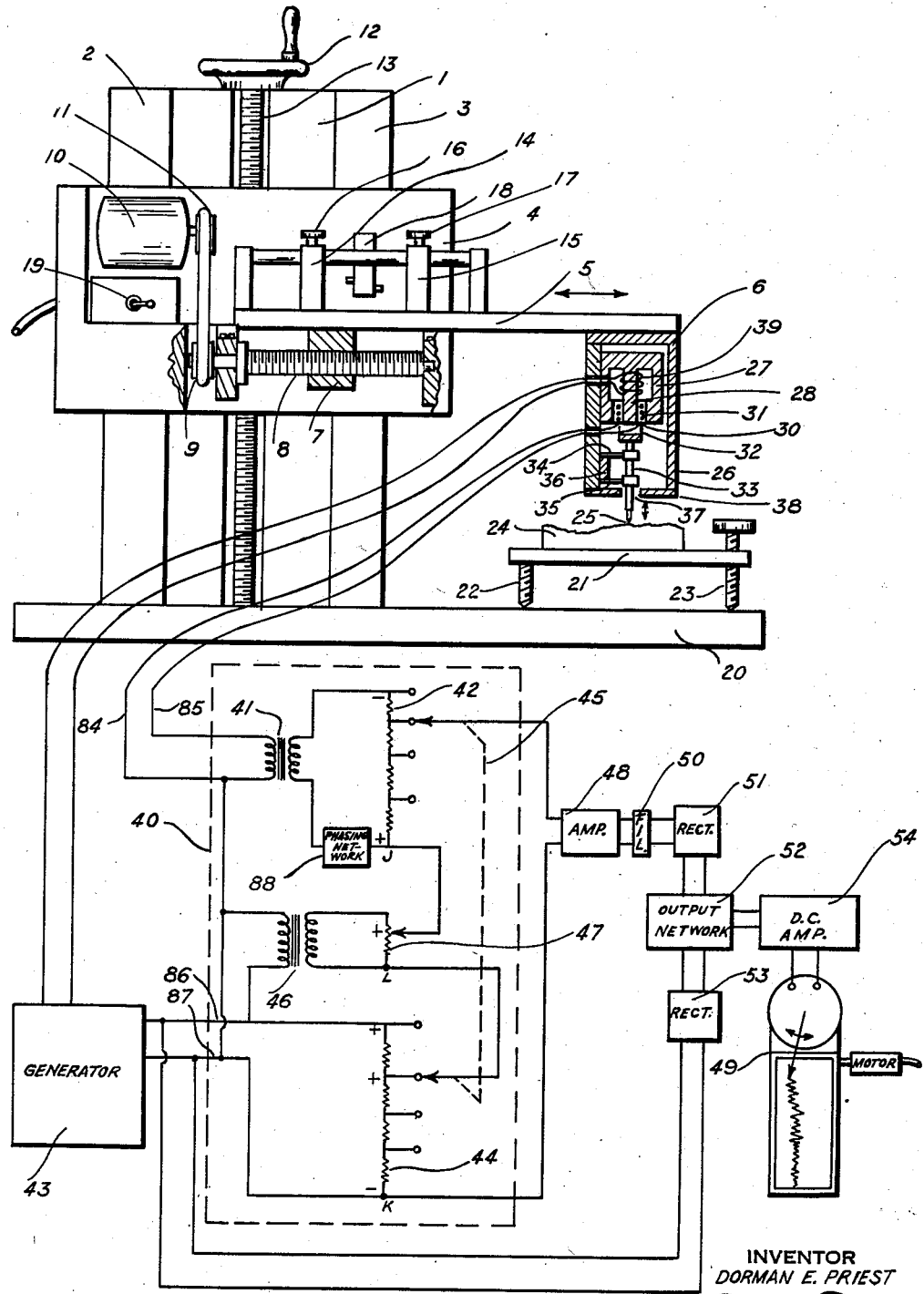
Figure 1 shows an assembly of a preferred form of profile recording apparatus particularly adapted for making linear investigations, and wherein certain of the electric circuit elements are diagrammatically illustrated.

Referring more particularly to Figure 1 of the drawings, the stationary body member 1, with its vertical ways 2 and 3, has mounted thereon for vertical movement, a support member 4 carrying a horizontal piloting slide 5, which in turn carries converter assembly 6. The horizontal piloting slide 5, has mounted on its underface, a suitable threaded nut 7, in engagement with screw 8 which is suitably supported at its ends and carries pulley 9, which is driven by a reversible motor 10, through belt 11.

The vertical position of the support 4 (Figure 1), is adjusted by means of crank 12, which operates threaded shaft 13, and that shaft in turn engages a suitable threaded portion (not shown) of support 4. A conventional locking means (not shown) is used for holding the assembly in an adjusted position. Length-of-trace adjustment blocks 14 and 15, mounted on piloting slide 5, and which may be conveniently locked in place by means of suitable thumb screws 16 and 17, are used to actuate a suitable motor operation-limiting switch 18, which is carried on support 4. A conventional switch 19, is used for controlling the operation of motor 10.

Stationary body member 1 (Figure 1), is rigidly fastened to a base plate 20, and an alinement table 21, preferably having two fixed legs 22, and one adjustable leg 23, rests on this base plate and carries on its upper face a specimen 24, the surface of which is to be linearly investigated by contact with a suitable tracer point 25 which projects from converter assembly 6. In actual use, the support 4 is suitably adjusted up or down, following which alinement table 21 is adjusted by means of adjustable leg 23 so that the surface of the specimen is suitably alined in the direction of movement of piloting slide 5 carrying the converter assembly 6. With the specimen in adjusted position, tracing motion is performed when switch 19 is thrown to operating position and the converter assembly is moved substantially parallel to the specimen surface while the tracer point is in contact with such surface and limited to motion substantially perpendicular thereto.

Figure 3:
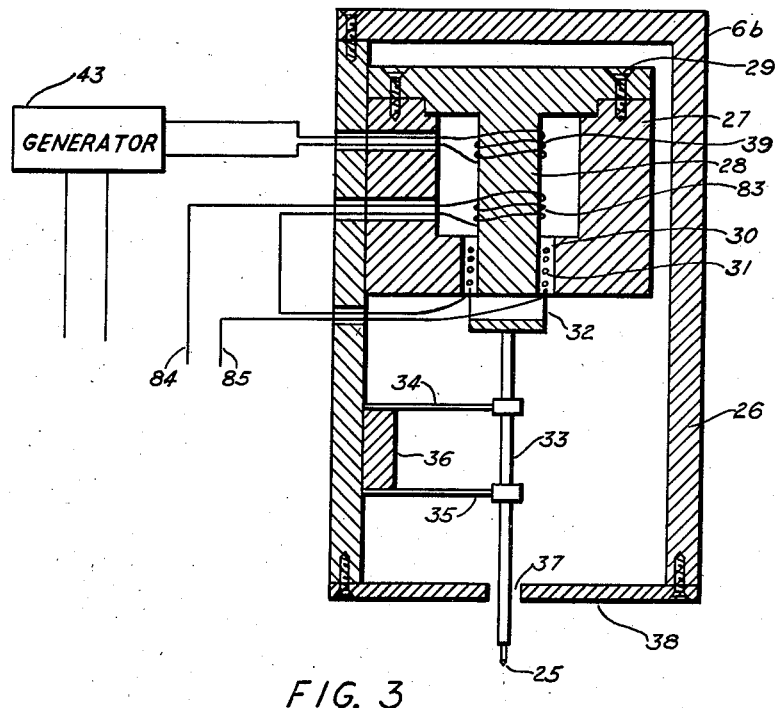
Figure 3 shows a modified form of the displacement converter of the Figure 1 assembly, and wherein the positioning coil is connected in series with a third coil suitably mounted in the magnetic flux field of the converter.

Case 26 of the converter assembly 6 contains an outer pole member 27 and an inner pole member 28 concentric therewith. These two pole members, which are made of suitable material for carrying alternating magnetic flux, are fastened together in conventional manner, for instance, by means of screws 29 (Figure 3). The gap 30 between the free ends of the outer and inner poles is substantially uniform and moderately long. Mounted for movement axially in gap 30 is a relatively short positioning coil 31 mounted on a light-weight coil form 32. This coil form is mounted on the end of stem 33 which is supported by a pair of cantilever leaf springs 34 and 35 which are joined to case 26 by means of a conventional spacing block 36. Stem 33 projects through a suitable opening 37 in end plate 38 and carries contact tracer point 25. The particular form of the tracer point will depend upon the type of investigations to be made. For surface roughness measurements a hemispherical tracer tip of from .00005″ to .0005″ tip radius is very satisfactory, and a conventional material from which to make same is diamond. To determine waviness of a surface the tracer tip may have a larger radius.

An exciting coil 39 is used to produce the alternating magnetic flux in pole pieces 27 and 28. This flux crosses gap 30, and by linking positioning coil 31 therein, produces an alternating "carrier" voltage in that coil. The amplitude of said "carrier" voltage depends upon the relative position of the positioning coil 31 in gap 30. Thus, the voltage produced in the positioning coil 31 is amplitude-modulated in step with the mechanical axial displacements of said coil.

Referring again to Figure 1, it will be noted that an input and phasing network 40 has been indicated as included within the dashed lines. A preferred form of the input and phasing network circuit will now be described. The output of positioning coil 31 is passed to input and phasing network 40 which also serves as a range selector providing a set of predetermined sensitivities. From the input of network 40, the voltage passes through a step-up input transformer 41 and a phasing network 88 to a stepped signal-attenuator 42. A pre-chosen, constant alternating current voltage is supplied by generator 43 to a stepped neutralizing-attenuator 44 which is ganged by mechanical coupling 45 to stepped signal-attenuator 42 so that the two may be operated in synchronism. An isolating transformer 46 is also connected to generator 43 and delivers a voltage to control-resistor 47. The voltage appearing on the input terminals of the amplifier 48 is obtained through the circuit connections between the amplifier, control resistor 47, and the two stepped attenuators 42 and 44, and is the algebraic addition of the alternating current voltages selected by each of the above mentioned controls, said voltages appearing between the movable contact arms on the controls and their respective ends J, K, and L. Phase adjusting network 88 is adjusted so that the voltage across stepped signal-attenuator 42 is substantially 180° out of phase with the voltage across stepped neutralizing-attenuator 44. Stepped signal-attenuator 42 attenuates the output of the positioning coil 31 in discrete, chosen steps, thus permitting selection of different sensitivities. In order that the magnitude of the voltage appearing on the input of amplifier 48 may remain substantially constant for these different sensitivities, the neutralizing voltage which is subtracted from that obtained from the positioning coil 31, and which is obtained from neutralizing-attenuator 44, is also attenuated in chosen, discrete steps. This results in selected positions of the mechanically ganged control offering a choice of over-all electrical magnifications between the displacement of positioning coil 31 and the displacement of the pointer on a suitable indicator 49. After the voltage algebraically added to that appearing across signal-attenuator 42 has been approximately adjusted in relatively large steps by neutralizing-attenuator 44, it may be more finely adjusted by control resistor 47. Since the magnitude of the voltage algebraically added to that appearing across signal-attenuator 42 affects the reading of indicator 49 for a given rest position of positioning coil 31, control resistor 47 may be used to adjust said reading to a predetermined zero without affecting sensitivity.

The output from the input and phasing network 40, is amplified in amplifier 48, and delivered to a band-pass filter unit 50. Band-pass filter unit 50 reduces the amount of extraneous voltages which appear in amplifier 48, and allows the narrow band of frequencies used in the measurement to be transmitted substantially without interference. The filter output is delivered to a rectifier circuit 51. This rectification provides demodulation of the amplitude-modulated carrier so that voltages of frequencies corresponding to the displacements of tracer point 25 are obtained. The output of rectifier 51 is delivered to output network 52.

Generator 43 also delivers a pre-chosen and constant alternating current voltage to rectifier circuit 53, and the pre-chosen constant direct current output of the latter is delivered to output network 52, but is of opposite polarity to the input thereto from rectifier circuit 51, so as to substantially cancel out the remaining minimum voltage not neutralized in input and phasing network 40. Under these conditions, the instantaneous value of any voltage appearing in the output of the network 52 is, for all practical purposes, due entirely to a displacement of the positioning coil 31 from the pre-chosen zero or reference position of same. These instantaneous voltages are thus obtained by the demodulating action of rectifier 51 on the amplitude-modulated carrier voltage appearing in amplifier 48. These instantaneous voltages are then further amplified by a direct current amplifier 54 whose output is applied to the indicating or recording meter 49. A suitable type of recorder 49 consists of a D'Arsonval type of movement carrying a pointer which may be arranged to indicate, or to mark directly on a moving chart. The amplifier 54 and D'Arsonval type recorder 49 are well recognized to have characteristics suitable for following the variations of voltage corresponding to the mechanical axial displacements of coil 31, but not the carrier frequency. Such chart is preferably motor driven at a predetermined and chosen rate of speed. The ratio of this speed to the tracing motion speed of the converter assembly determines the magnification along the chart, and the calibration of the above described electrical circuits determines the magnification across the chart. Thus a suitably enlarged profile curve of the specimen is recorded. The magnification of the profile curve obtainable through the combination set forth above, makes possible the recording of inequalities of a surface profile in amounts substantially as small as one microinch.

Figure 2:
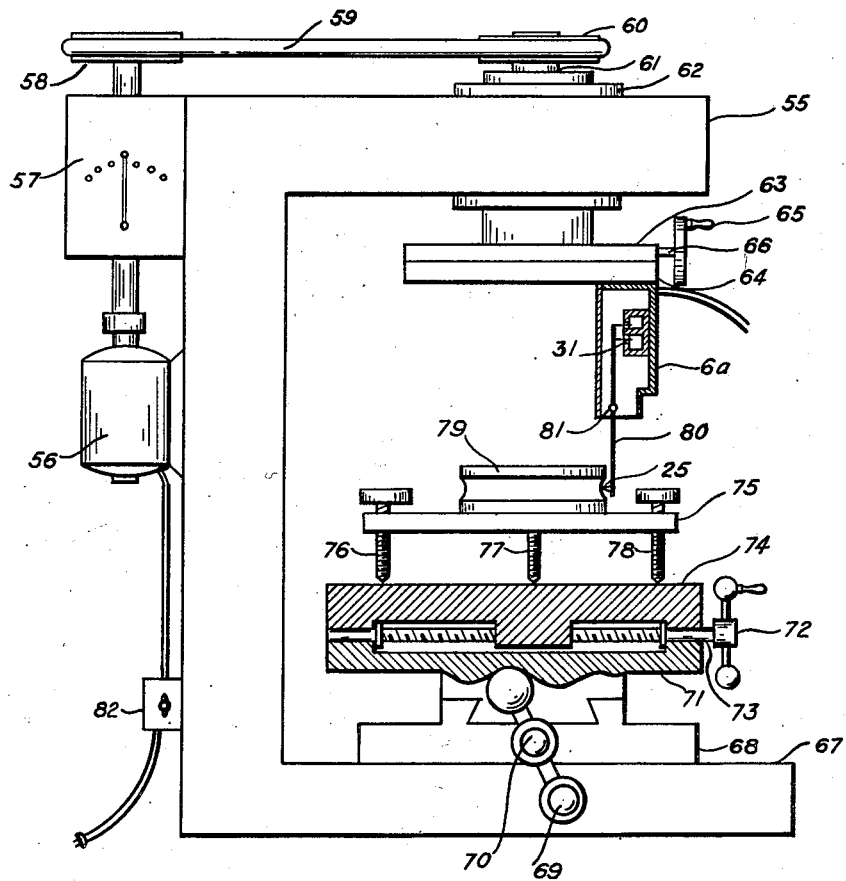
Figure 2 shows an assembly adapted for use in investigating the profile of circular or cylindrical objects with the electrical output of such apparatus deliverable to an electric circuit such as is shown in Figure 1.

Another type of apparatus utilizing the present invention is illustrated in Figure 2 wherein supporting frame 55 carries a motor 56 conventionally coupled to an adjustable speed reducer 57 which, in turn, has an output pulley 58. Belt 59 connects pulley 58 to pulley 60 which is mounted on the vertical piloting shaft 61, which, in turn, passes through piloting bearing 62. On the lower end of vertical piloting shaft 61 is mounted a head member 63 which carries a radial movement member 64, the movement of which is controlled by crank 65 and screw 66. Supported by the radial movement member 64 is a converter assembly 6a.

Mounted on the base portion 67 (Figure 2) of supporting frame 55 is a compound member 68 of conventional design which includes a crank 69 connected to a conventional threaded shaft 70 for moving cross slide 71 crosswise of the assembly. Crank 72 is mounted on shaft 73 which, in turn, is mounted in cross slide 71 and is threadedly connected to cross slide 74 and provides movement in a direction normally at right angles to the movement of cross slide 71. The upper face of cross slide 74 is preferably perpendicular to the longitudinal axis of vertical piloting shaft 61 which extends through supporting frame 55. A leveling table 75 may be mounted on the upper face of cross slide 74 and this leveling table in turn is preferably supported by three adjustable screws 76, 77, and 78. The specimen to be tested, for instance, the inner race 79 of a ball bearing, is mounted on the upper face of leveling table 75 and adjusted by means of operating cranks 69 and 72 until its vertical center line coincides with the vertical center line of vertical piloting shaft 61. With the specimen 79 thus leveled and alined, the converter assembly 6a is adjusted by means of crank 65 until contacting tracer point 25 lightly rests against the surface of the specimen to be investigated. To provide clearance, a beam type converter is preferably used here. This converter is substantially the same as the converter shown in Figure 1 except that tracer point 25 is mounted on the end of a resiliently mounted beam 80 which is carried on a suitable pivot 81, with that beam in turn carrying on its other end a positioning coil 31 movable in the gap of the alternating current magnet. Switch 82, which connects motor 56 to a suitable source of power, is turned to "on" position and the motor then acts through adjustable speed reducer 57, pulley 58, and belt 59 connecting pulleys 58 and 60, to rotate vertical piloting shaft 61 and carry converter assembly 6a around specimen 79 very slowly. A part or full revolution of the piloting shaft is normally all that is required for an investigation, although same may be repeated as often as desired. For example, to investigate the surface of a 1½" inner race of a ball bearing for waviness, a speed of approximately 2 R. P. M., is satisfactory. On the other hand, to check the same ball race for roughness, a speed of approximately ¼ R. P. M., is satisfactory. These speeds are merely given by way of example and same are not to be considered as a limitation of the invention. When converter assembly 6a is moved around inner race 79, the tracer point 25 will move radially as the surface of inner race 79 varies from a true circle concentric with the center line of vertical piloting shaft 61. This movement of the contacting tracer point in turn actuates the positioning coil on the other end of beam 80 to thus modulate the "carrier" voltage which is delivered to an electrical circuit as previously described.

A modified form of the converter assembly 6, shown in the Figure 1 combination, is diagrammatically illustrated as 6b in Figure 3. This converter assembly involves the use of a third coil 83 on the alternating magnetic flux circuit of the assembly. This third coil 83 is connected in series with positioning coil 31 to algebraically adjust, in desired direction and amount, the output voltage of the combination. This adjustment in no way affects the modulation obtained by varying the position of positioning coil 31 lengthwise of gap 30. The combined output of positioning coil 31 and third coil 83 is carried by leads 84 and 85 to the input and phasing network 40 for handling as previously described. With the third coil 83 connected in series with the positioning coil 31, the output or "carrier" voltage of the converter for a given position of the positioning coil can be adjusted by adjusting the voltage supplied by the third coil. However, the rate of change of the amplitude of the "carrier" voltage with the displacement of the positioning coil will be unaffected by the amount of voltage supplied by the third coil. This is due to the fact that the modulation of the "carrier" voltage is determined only by the change in flux linkages of the positioning coil. This facilitates the production of interchangeable converter assembles, since the amplitude of the converter output voltage and the derivative of said output voltage with respect to the position of coil 31 can be set independently.

Figure 4:
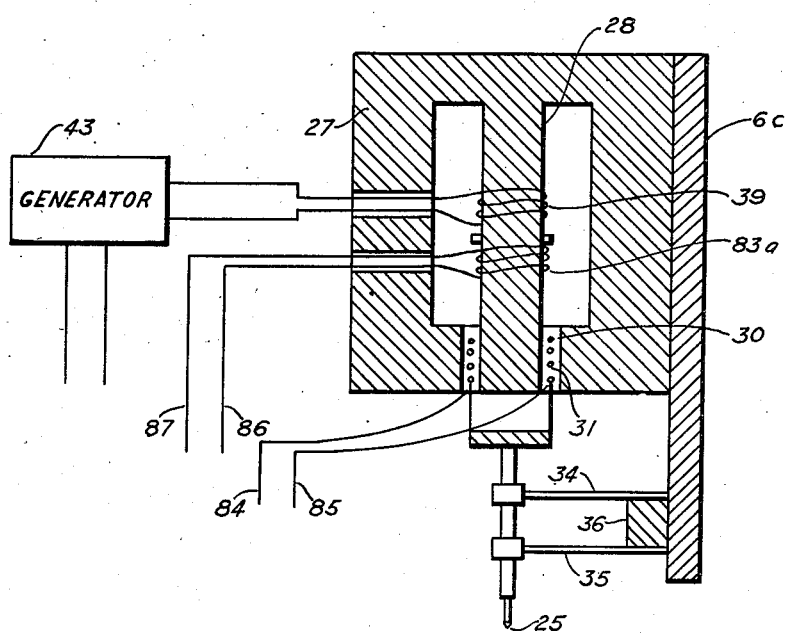
Figure 4 shows another modified form of the displacement converter of Figure 1, and wherein a third coil in the converter is used to produce a bucking voltage utilizable in the input and phasing network.

Figure 4 diagrammatically shows another modification of the converter assembly wherein a third coil 83a forms part of an alternating current bucking circuit adapted for use in the circuit of Figure 1. In this combination the prechosen, constant alternating current voltage, delivered to input and phasing network 40 by means of leads 86 and 87 is obtained from the third coil 83a which links a suitable portion of the magnetic flux circuit such as pole 28 of the conveter assembly 6c. Since this voltage is more nearly of the same wave shape as that received from positioning coil 31, neutralization of the minimum voltage delivered by the positioning coil to the input and phasing network 40 is more readily accomplished.

Other modes of applying the principle of my invention may be employed instead of those explained, change being made as regards the combinations herein disclosed, provided the means stated by any of the following claims or the equivalent of such stated means be employed.

I therefore particularly point out and distinctly claim as my invention:

1. A surface profile measuring instrument capable of indicating or recording irregularities of the surface of a specimen to be investigated, which comprises a converter assembly including a tracer point, a positioning coil, means for connecting said positioning coil to said tracer point for movement in step with the mechanical displacements thereof, means for mounting said connecting means in said converter assembly so as to restrict said tracer point to movement substantially perpendicular to said specimen surface, fixed electromagnetic means for converting said mechanical displacements of said positioning coil into amplitude modulations of a constant frequency alternating voltage as said tracer point is moved along and in contact with the surface of said specimen, means for supporting said converter assembly, means for moving said support so that said converter assembly moves substantially parallel to the surface of said specimen under investigation, means for supporting said movable support means, a demodulating electric circuit means for receiving said modulated voltage and demodulating same, and means for indicating said demodulated voltage so as to show the irregularities of the surface of said specimen being investigated.

2. A surface profile measuring instrument capable of indicating or recording irregularities of the surface of a specimen to be investigated, which comprises a converter assembly including a fixed magnetic circuit means for carrying alternating magnet flux, a tracer point, a positioning coil, means for connecting said positioning coil to said tracer point for movement in step with the mechanical displacements thereof, means for mounting said connecting means in said converter assembly so as to restrict said tracer point to movement substantially perpendicular to said specimen surface, said fixed magnetic circuit means having a gap, and said positioning coil being movable in said gap, an exciting coil for use in producing alternating magnetic flux in said fixed magnetic circuit means, means for supplying alternating-current electric power to said exciting coil thus inducing in said positioning coil a voltage whose frequency is that of said alternating-current power and whose amplitude is modulated in accordance with the varying position of said coil with respect to said fixed magnetic circuit means as said tracer point is moved along and in contact with the surface of said specimen, means for supporting said converter assembly, means for moving said support so that said converter assembly moves substantially parallel to the surface of said specimen under investigation, means for supporting said movable support means, a demodulating electric circuit means for receiving said modulated voltage and demodulating same, and means for indicating said demodulated voltage so as to show the irregularities of the surface of said specimen being investigated.

3. A surface profile measuring instrument capable of indicating or recording irregularities of the surface of a specimen to be investigated, which comprises a converter assembly including a tracer point, a positioning coil, means for connecting said positioning coil to said tracer point for movement in step with the mechanical displacements thereof, means for mounting said connecting means in said converter assembly so as to restrict said tracer point to movement substantially perpendicular to said specimen surface, fixed electromagnetic means for converting said mechanical displacements of said positioning coil into amplitude modulations of a constant-frequency alternating voltage as said tracer point is moved along and in contact with the surface of said specimen, means for supporting said converter assembly, means for moving said support so that said converter assembly moves substantially parallel to the surface of said specimen under investigation, means for supporting said movable support means, a demodulating circuit including a sensitivity adjusting circuit, an amplifier, a rectifier arranged to demodulate said amplitude-modulated carrier voltage, and means for indicating said demodulated voltage so as to show the irregularities of the surface of said specimen being investigated.

4. A surface profile measuring instrument capable of indicating or recording irregularities of the surface of a specimen to be investigated, which comprises a converter assembly including a tracer point, a positioning coil, means for connecting said positioning coil to said tracer point for movement in step with the mechanical displacements thereof, means for mounting said connecting means in said converter assembly so as to restrict said tracer point to movement substantially perpendicular to said specimen surface, fixed electromagnetic means for converting said mechanical displacements of said positioning coil into amplitude modulations of a constant-frequency alternating voltage as said tracer point is moved along and in contact with the surface of said specimen, means for supporting said converter assembly, means for moving said support so that said converter assembly moves substantially parallel to the surface of said specimen under investigation, means for supporting said movable support means, a demodulating electric circuit means for receiving said modulated voltage and demodulating same, indicating means responsive to said demodulated voltage, said indicating means comprising a graphic recording means adapted to record on a suitable medium a graph whose coordinates are substantially proportional to the corresponding dimensions of said irregularities actuating said tracer point.

5. A surface profile measuring instrument capable of indicating or recording non-recurrent irregularities such as plateaus, steps, bows, and slopes, as well as oscillatory irregularities of the surface of a specimen to be investigated, which comprises means for supporting said specimen in position for profile investigation, a converter assembly including a fixed magnetic circuit means for carrying alternating magnetic flux, a tracer point, a positioning coil, means for connecting said positioning coil to said tracer point for movement in step with the mechanical displacements thereof, resilient means for mounting said connecting means in said converter assembly so as to restrict said tracer point to movement substantially perpendicular to said specimen surface, said fixed magnetic circuit means having an annular pole gap, and said positioning coil being axially movable in said gap and approximately centered longitudinally thereof, an exciting coil for producing alternating magnetic flux in said magnetic circuit means, means for supplying a constant alternating voltage to said exciting coil thus inducing in said positioning coil a voltage whose frequency is that of said alternating voltage and whose amplitude is modulated in accordance with the varying position of said positioning coil in said gap of said fixed magnetic circuit means as said tracer point is moved along and in contact with the surface of said specimen, means for supporting said converter assembly, means for moving said support so that said converter assembly moves in a path substantially parallel to the surface of said specimen under investigation, means for supporting said movable support means, an electric circuit means for receiving said modulated voltage and demodulating same, an amplifier for amplifying said demodulated voltage, and an indicating means responsive to said demodulated and amplified voltage, said indicating means comprising a graphic recording means adapted to record on a suitable medium a graph whose coordinates are substantially proportional to the corresponding dimensions of said irregularities actuating said tracer point.

6. A surface profile measuring instrument capable of indicating or recording irregularities of the surface of a specimen to be investigated, which comprises a converter assembly including a fixed magnetic circuit means for carrying alternating magnetic flux, a tracer point, a positioning coil, means for connecting said positioning coil to said tracer point for movement in step with the mechanical displacements thereof, means for mounting said connecting means in said converter assembly so as to restrict said tracer point to movement substantially perpendicular to said specimen surface, said fixed magnetic circuit means having a gap, and said positioning coil being movable in said gap, an exciting coil for use in producing alternating magnetic flux in said fixed magnetic circuit means, means for supplying alternating-current electric power to said exciting coil thus inducing in said positioning coil a voltage whose frequency is that of said alternating-current power and whose amplitude is modulated in accordance with the varying position of said coil with respect to said fixed magnetic circuit means as said tracer point is moved along and in contact with the surface of said specimen, a third coil mounted on said magnetic circuit and inductively linked with said alternating magnetic flux thereby inducing in said third coil an alternating voltage of frequency the same as that of said alternating-current electric power, and of magnitude determined by said magnetic linkage, means for connecting said third coil in series with said positioning coil so that the voltage output of said converter assembly is the algebraic sum of the voltages induced in said two coils, said output voltage being amplitude-modulated to the extent that said positioning coil voltage is modulated, means for supporting said movable support means, a demodulating electric circuit means for demodulating said modulated output voltage, and means for indicating said demodulated voltage so as to show the irregularities of the surface of said specimen being investigated.

7. A surface profile measuring instrument capable of indicating or recording irregularities of the surface of a specimen to be investigated, which comprises a converter assembly including a fixed magnetic circuit means for carrying alternating magnetic flux, a tracer point, a positioning coil, means for connecting said positioning coil to said tracer point for movement in step with the mechanical displacements thereof, means for mounting said connecting means in said converter assembly so as to restrict said tracer point to movement substantially perpendicular to said specimen surface, said fixed magnetic circuit means having a gap, and said positioning coil being movable in said gap, an exciting coil for use in producing alternating magnetic flux in said fixed magnetic circuit means, means for supplying alternating-current electric power to said exciting coil thus inducing in said positioning coil a voltage whose frequency is that of said alternating-current power and whose amplitude is modulated in accordance with the varying position of said coil with respect to said fixed magnetic circuit means as said tracer point is moved along and in contact with the surface of said specimen, means for supporting said converter assembly, means for moving said support so that said converter assembly moves substantially parallel to the surface of said specimen under investigation, means for supporting said movable support means, a sensitivity adjusting circuit including a stepped attenuator receiving the amplitude-modulated output voltage of said converter assembly, a second stepped attenuator receiving a substantially fixed alternating voltage from said means for supplying alternating-current power, electric circuit means for adjusting the voltages across said two attenuators to substantially 180° phase opposition, mechanical ganging means for simultaneous operation of said two attenuators, leads for connecting the outputs of said two attenuators in series, thereby obtaining an amplitude-modulated output voltage from said sensitivity adjusting circuit, a demodulating electric circuit means for receiving said modulated voltage and demodulating same, and means for indicating said demodulated voltage so as to show the irregularities of the surface of said specimen being investigated.

8. A surface profile measuring instrument capable of indicating or recording irregularities of the surface of a specimen to be investigated, which comprises a converter assembly including a fixed magnetic circuit means for carrying alternating magnetic flux, a tracer point, a positioning coil, means for connecting said positioning coil to said tracer point for movement in step with the mechanical displacements thereof, means for mounting said connecting means in said converter assembly so as to restrict said tracer point to movement substantially perpendicular to said specimen surface, said fixed magnetic circuit means having a gap, and said positioning coil being movable in said gap, an exciting coil for use in producing alternating magnetic flux in said fixed magnetic circuit means, means for supplying alternating-current electric power to said exciting coil thus inducing in said positioning coil a voltage whose frequency is that of said alternating-current power and whose amplitude is modulated in accordance with the varying position of said coil with respect to said fixed magnetic circuit means as said tracer point is moved along and in contact with the surface of said specimen, a third coil mounted on said magnetic circuit means, and inductively linked with said alternating magnetic flux thereby inducing in said third coil an alternating voltage of frequency the same as that of said alternating current electric power and of magnitude determined by said magnetic linkage, means for supporting said converter assembly, means for moving said support so that said converter assembly moves substantially parallel to the surface of said specimen under investigation, means for supporting said movable support means, a sensitivity adjusting circuit including a stepped attenuator receiving the amplitude-modulated output voltage of said converter assembly, a second stepped attenuator receiving a substantially fixed alternating voltage from said third coil in said converter assembly, electric circuit means for adjusting the voltages across said two attenuators to substantially 180° phase opposition, mechanical ganging means for simultaneous operation of said two attenuators, leads for connecting the outputs of said two attenuators in series, thereby obtaining an amplitude-modulated output voltage from said sensitivity adjusting circuit, a demodulating electric circuit means for receiving said modulated voltage and demodulating same, and means for indicating said demodulated voltage so as to show the irregularities of the surface of said specimen being investigated.

9. A surface profile measuring instrument capable of indicating or recording irregularities of the surface of a specimen to be investigated, which comprises a converter assembly including a fixed magnetic circuit means for carrying alternating magnetic flux, a tracer point, a positioning coil, means for connecting said positioning coil to said tracer point for movement in step with the mechanical displacements thereof, means for mounting said connecting means in said converter assembly so as to restrict said tracer point to movement substantially perpendicular to said specimen surface, said fixed magnetic circuit means having a gap, and said positioning coil being movable in said gap, an exciting coil for producing alternating magnetic flux in said fixed magnetic circuit means, means for supplying alternating-current electric power to said exciting coil thus inducing in said positioning coil a voltage whose frequency is that of said alternating-current power and whose amplitude is modulated in accordance with the varying position of said coil with respect to said fixed magnetic circuit means as said tracer point is moved along and in contact with the surface of said specimen, means for supporting said converter assembly, means for moving said support so that said converter assembly moves substantially parallel to the surface of said specimen under investigation, means for supporting said movable support means, a demodulating circuit including a sensitivity adjusting circuit, an amplifier, and a rectifier arranged to demodulate said amplitude-modulated carrier voltage, means for supplying a constant alternating voltage, a second rectifier receiving said alternating voltage and delivering a constant direct current voltage substantially equal to the direct current voltage output of said first rectifier, an output network arranged to receive the outputs of said two rectifiers and subtract said direct voltages so as to leave substantially only said demodulated voltage, and means for indicating said demodulated voltage so as to show the irregularities of the surface of said specimen being investigated.

10. A surface profile measuring instrument capable of indicating or recording irregularities of the surface of a specimen to be investigated, which comprises a converter assembly including a fixed magnetic circuit means for carrying alternating magnetic flux, a tracer point, a positioning coil, means for connecting said positioning coil to said tracer point for movement in step with the mechanical displacements thereof, means for mounting said connecting means in said converter assembly so as to restrict said tracer point to movement substantially perpendicular to said specimen surface, said fixed magnetic circuit means having a gap, and said positioning coil being movable in said gap, an exciting coil for producing alternating magnetic flux in said fixed magnetic circuit means for supplying alternating-current electric power to said exciting coil thus inducing in said positioning coil a voltage whose frequency is that of said alternating-current power and whose amplitude is modulated in accordance with the varying position of said coil with respect to said fixed magnetic circuit means as said tracer point is moved along and in contact with the surface of said specimen, means for supporting said converter assembly, means for moving said support so that said converter assembly moves substantially parallel to the surface of said specimen under investigation, means for supporting said movable support means, a demodulating circuit including a sensitivity adjusting circuit, an amplifier, an electric wave filter arranged to pass said modulated carrier voltage, and a rectifier arranged to demodulate said amplitude modulated carrier voltage, means for supplying a constant alternating voltage, a second rectifier receiving said alternating voltage and delivering a constant direct-current voltage substantially equal to the direct-current voltage output of said first rectifier, an output network arranged to receive the outputs of said two rectifiers and subtract said direct-current voltages so as to leave substantially only said demodulated voltage, an amplifier for amplifying said demodulated voltage, indicating means responsive to said demodulated voltage, said indicating means comprising a graphic recording means adapted to record on a suitable medium a graph whose coordinates are substantially proportional to the corresponding dimensions of said irregularities actuating said tracer point.

11. A surface profile measuring instrument capable of indicating or recording irregularities of the surface of a specimen to be investigated, which comprises a converter assembly including a tracer point, a positioning coil, means for connecting said positioning coil to said tracer point for movement in step with the mechanical displacements thereof, means for mounting said connecting means in said converter assembly so as to restrict said tracer point to movement substantially perpendicular to said specimen surface, fixed electromagnetic means for converting said mechanical displacements of said positioning coil into amplitude modulations of a constant frequency alternating voltage as said tracer point is moved along and in contact with the surface of said specimen, a piloting slide for supporting said converter assembly, means for moving said piloting slide so that said converter assembly will move substantially parallel to the surface of said specimen, adjustable means for supporting said piloting slide, a demodulating electric circuit means for receiving said modulated voltage and demodulating same, and means for indicating said demodulated voltage so as to show the irregularities of the surface of said specimen being investigated.

12. A surface profile measuring instrument capable of indicating or recording irregularities of the surface of a specimen to be investigated, which comprises a converter assembly including a fixed magnetic circuit means for carrying alternating magnetic flux, a tracer point, a positioning coil, means for connecting said positioning coil to said tracer point for movement in step with the mechanical displacements thereof, means for mounting said connecting means in said converter assembly so as to restrict said tracer point to movement substantially perpendicular to said specimen surface, said fixed magnetic circuit means having a gap, and said positioning coil being movable in said gap, an exciting coil for producing alternating magnetic flux in said fixed magnetic circuit means, means for supplying alternating-current electric power to said exciting coil thus inducing in said positioning coil a voltage whole frequency is that of said alternating-current power and whose amplitude is modulated in accordance with the varying position of said coil with respect to said fixed magnetic circuit means as said tracer point is moved along and in contact with the surface of said specimen, a piloting slide for supporting said converter assembly, means for moving said piloting slide so that said converter assembly will move substantially parallel to the surface of said specimen, adjustable means for supporting said piloting slide, a demodulating circuit including a sensitivity adjusting circuit, an amplifier, and a rectifier arranged to demodulate said amplitude modulated carrier voltage, means for supplying a constant alternating voltage, a second rectifier receiving said alternating voltage and delivering a constant direct-current voltage substantially equal to the direct-current voltage output of said first rectifier, an output network arranged to receive the outputs of said two rectifiers and subtract said direct-current voltages so as to leave substantially only said demodulated voltage, indicating means responsive to said demodulated voltage, said indicating means comprising a graphic recording means adapted to record on a suitable medium a graph whose coordinates are substantially proportional to the corresponding dimensions of said irregularities actuating said tracer point.

13. A surface profile measuring instrument capable of indicating or recording irregularities of the surface of a specimen to be investigated, which comprises a converter assembly including a fixed magnetic circuit means for carrying alternating magnetic flux, a tracer point, a positioning coil, means for connecting said positioning coil to said tracer point for movement in step with the mechanical displacements thereof, means for mounting said connecting means in said converter assembly so as to restrict said tracer point to movement substantially perpendicular to said specimen surface, said fixed magnetic circuit means having a gap, and said positioning coil being movable in said gap, an exciting coil for producing alternating magnetic flux in said fixed magnetic circuit means, means for supplying alternating-current electric power to said exciting coil thus inducing in said positioning coil a voltage whose frequency is that of said alternating-current power and whose amplitude is modulated in accordance with the varying position of said coil with respect to said fixed magnetic circuit means as said tracer point is moved along and in contact with the surface of said specimen, a piloting slide for supporting said converter assembly, means for moving said piloting slide so that said converter assembly will move substantially parallel to the surface of said specimen, adjustable means for supporting said piloting slide, a demodulating circuit including a sensitivity adjusting circuit, an amplifier, an electric wave filter arranged to pass said modulated carrier voltage, and a rectifier arranged to demodulate said amplitude-modulated carrier voltage, means for supplying a constant alternating voltage, a second rectifier receiving said alternating voltage and delivering a constant direct-current voltage substantially equal to the direct-current voltage output of said first rectifier, an output network arranged to receive the outputs of said two rectifiers and subtract said direct-current voltages so as to leave substantially only said demodulated voltage, an amplifier for amplifying said demodulated voltage, and means for indicating said amplified demodulated voltage so as to show the irregularities of the surface of said specimen being investigated.

14. A surface profile measuring instrument capable of indicating or recording irregularities of the surface of a specimen to be investigated, which comprises a converter assembly including a tracer point, a positioning coil, means for connecting said positioning coil to said tracer point for movement in step with the mechanical displacements thereof, means for mounting said connecting means in said converter assembly so as to restrict said tracer point to movement substantially perpendicular to said specimen surface, fixed electromagnetic means for converting said mechanical displacements of said positioning coil into amplitude modulations of a constant frequency alternating voltage as said tracer point is moved along and in contact with the surface of said specimen, a piloting slide for supporting said converter assembly, means for moving said piloting slide so that said converter assembly will move substantially parallel to the surface of said specimen, adjustable means for supporting said piloting slide, a demodulating circuit including a sensitivity adjusting circuit, an amplifier, an electric wave filter arranged to pass said modulated carrier voltage, and a rectifier arranged to demodulate said amplitude-modulated carrier voltage, means for supplying a constant alternating voltage, a second rectifier receiving said alternating voltage and delivering a constant direct-current voltage substantially equal to the direct-current voltage output of said first rectifier, an output network arranged to receive the outputs of said two rectifiers and subtract said direct-current voltages so as to leave substantially only said demodulated voltage, an amplifier for amplifying said demodulated voltage, indicating means responsive to said demodulated voltage, said indicating means comprising a graphic recording means adapted to record on a suitable medium a graph whose coordinates are substantially proportional to the corresponding dimensions of said irregularities actuating said tracer point.

15. A surface profile measuring instrument capable of indicating or recording irregularities of the surface of a specimen to be investigated, which comprises a converter assembly including a fixed magnetic circuit means for carrying alternating magnetic flux, a tracer point, a positioning coil, means for connecting said positioning coil to said tracer point for movement in step with the mechanical displacements thereof, means for mounting said connecting means in said converter assembly so as to restrict said tracer point to movement substantially perpendicular to said specimen surface, said fixed magnetic circuit means having a gap, and said positioning coil being movable in said gap, an exciting coil for producing alternating magnetic flux in said fixed magnetic circuit means, means for supplying alternating-current electric power to said exciting coil thus inducing in said positioning coil a voltage whose frequency is that of said alternating-current power and whose amplitude is modulated in accordance with the varying position of said coil with respect to said fixed magnetic circuit means as said tracer point is moved along and in contact with the surface of said specimen, a piloting slide for supporting said converter assembly, means for moving said piloting slide so that said converter assembly will move substantially parallel to the surface of said specimen, means for supporting said piloting slide, an alinement table for adjustably supporting said specimen in position for profile investigation, a demodulating circuit including a sensitivity adjusting circuit, an amplifier, an electric wave filter arranged to pass said modulated carrier voltage, and a rectifier arranged to demodulate said amplitude-modulated carrier voltage, means for supplying a constant alternating voltage, a second rectifier receiving said alternating voltage and delivering a constant direct-current voltage substantially equal to the direct-current voltage output of said first rectifier, an output network arranged to receive the outputs of said two rectifiers and subtract said direct-current voltages so as to leave substantially only said demodulated voltage, an amplifier for amplifying said demodulated voltage, indicating means responsive to said demodulated voltage, said indicating means comprising a graphic recording means adapted to record on a suitable medium a graph whose coordinates are substantially proportional to the corresponding dimensions of said irregularities actuating said tracer point.

16. A surface profile measuring instrument capable of indicating or recording irregularities of the surface of a specimen to be investigated, which comprises a converter assembly including a tracer point, a positioning coil, means for connecting said positioning coil to said tracer point for movement in step with the mechanical displacements thereof, means for mounting said connecting means in said converter assembly so as to restrict said tracer point to movement substantially perpendicular to said specimen surface, fixed electromagnetic means for converting said mechanical displacements of said positioning coil into amplitude modulations of a constant-frequency alternating voltage as said tracer point is moved along and in contact with the surface of said specimen, a rotary supporting means for said converter assembly, means for radially adjusting the location of said converter assembly on said rotary supporting means, means for rotating said rotary support means, adjustable means for mounting and alining said specimen in position for profile investigation, a demodulating electric circuit means for receiving said modulated voltage and demodulating same, and means for indicating said demodulated voltage so as to show the irregularities of the surface of said specimen being investigated.

17. A surface profile measuring instrument capable of indicating or recording irregularities of the surface of a specimen to be investigated, which comprises a converter assembly including a fixed magnetic circuit means for carrying alternating magnetic flux, a tracer point, a positioning coil, means for connecting said positioning coil to said tracer point for movement in step with the mechanical displacement thereof, means for mounting said connecting means in said converter assembly so as to restrict said tracer point to movement substantially perpendicular to said specimen surface, said fixed magnetic circuit means having a gap, and said positioning coil being movable in said gap, an exciting coil for producing alternating magnetic flux in said fixed magnetic circuit means, means for supplying alternating-current electric power to said exciting coil thus inducing in said positioning coil a voltage whose frequency is that of said alternating-current power and whose amplitude is modulated in accordance with the varying position of said coil with respect to said fixed magnetic circuit means as said tracer point is moved along and in contact with the surface of said specimen, a rotary supporting means for said converter assembly, means for radially adjusting the location of said converter assembly on said rotary supporting means, means for rotating said rotary support means, adjustable means for mounting and alining said specimen in position for profile investigation, a demodulating circuit including a sensitivity adjusting circuit, an amplifier, and a rectifier arranged to demodulate said amplitude-modulated carrier voltage, indicating means responsive to said demodulated voltage, said indicating means comprising a graphic recording means adapted to record on a suitable medium a graph whose coordinates are substantially proportional to the corresponding dimensions of said irregularities actuating said tracer point.

18. A surface profile measuring instrument capable of indicating or recording irregularities of the surface of a specimen to be investigated, which comprises a converter assembly including a fixed magnetic circuit means for carrying alternating magnetic flux, a tracer point, a positioning coil, means connecting said positioning coil to said tracer point for movement in step with the mechanical displacements thereof, means for mounting said connecting means in said converter assembly so as to restrict said tracer point to movement substantially perpendicular to said specimen surface, said fixed magnetic circuit means having a gap, and said positioning coil being movable in said gap, an exciting coil for use in producing alternating magnetic flux in said fixed magnetic circuit means, means for supplying alternating-current electric power to said exciting coil thus inducing in said positioning coil a voltage whose frequency is that of said alternating-current power and whose amplitude is modulated in accordance with the varying position of said coil with respect to said fixed magnetic circuit means as said tracer point is moved along and in contact with the surface of said specimen, a rotary supporting means for said converter assembly, means for radially adjusting the location of said converter assembly on said rotary supporting means, adjustable speed means for rotating said rotary support means, adjustable means for mounting and alining said specimen in position for profile investigation, a demodulating circuit including a sensitivity adjusting circuit, an amplifier, and a rectifier arranged to demodulate said amplitude-modulated carrier voltage, means for supplying a constant alternating voltage, a second rectifier receiving said alternating voltage and delivering a constant direct-current voltage substantially equal to the direct-current voltage output of said first rectifier, an output network arranged to receive the outputs of said two rectifiers and subtract said direct-current voltages so as to leave substantially only said demodulated voltage, indicating means responsive to said demodulated voltage, said indicating means comprising a graphic recording means adapted to record on a suitable medium a graph whose coordinates are substantially proportional to the corresponding dimensions of said irregularities actuating said tracer point.

19. In a surface profile measuring instrument capable of indicating or recording irregularities of the surface of a specimen to be investigated and having a movable support adapted to have a converter assembly mounted thereon, means for moving said support so that the converter assembly will move substantially parallel to the surface of said specimen under investigation, means for supporting said movable support means, a source of alternating-current carrier power, a demodulating electric circuit means for receiving modulated voltage and demodulating same, and means for indicating the demodulated voltage so as to show the irregularities of the surface of said specimen being investigated, the combination therewith of a converter assembly mounted on said movable support, said converter assembly including a tracer point, a positioning coil, means for connecting said positioning coil to said tracer point for movement in step with the mechanical displacements thereof, means for mounting said connecting means in said converter assembly so as to restrict said tracer point to movement substantially perpendicular to said specimen surface, means for inductively coupling said source to said positioning coil, fixed electromagnetic means for use in converting said mechanical displacements of said positioning coil into amplitude modulations of said induced voltage in said positioning coil as said tracer point is moved along and in contact with the surface of said specimen, and electric circuit means for operably connecting the amplitude-modulated alternating-current voltage output of said positioning coil to said demodulating electric circuit means.

20. In a surface profile measuring instrument capable of indicating or recording irregularities of the surface of a specimen to be investigated and having a movable support adapted to have a converter assembly mounted thereon, means for moving said support so that the converter assembly will move substantially parallel to the surface of said specimen under investigation, means for supporting said movable support means, a demodulating electric circuit means for receiving modulated voltage and demodulating same, and means for indicating the demodulated voltage so as to show the irregularities of the surface of said specimen being investigated, the combination therewith of a converter assembly mounted on said movable support, said converter assembly including a tracer point, a positioning coil, means for connecting said positioning coil to said tracer point for movement in step with the mechanical displacements thereof, means for mounting said connecting means in said converter assembly so as to restrict said tracer point to movement substantially perpendicular to said specimen surface, a fixed magnetic circuit means having a gap and said positioning coil being movable in said gap, an exciting coil for use in producing alternating magnetic flux in said magnetic circuit means, together with means for supplying alternating-current electric power to said exciting coil thus inducing in said positioning coil a voltage whose frequency is that of said alternating-current power and whose amplitude is modulated in accordance with the varying position of said coil with respect to said fixed magnetic circuit means as said tracer point is moved along and in contact with the surface of said specimen, and electric circuit means for operably connecting the amplitude-modulated constant-frequency voltage output of said positioning coil to said demodulating electric circuit means.

DORMAN E. PRIEST.

REFERENCES CITED

The following references are of record in the file of this patent:

UNITED STATES PATENTS

| Number | Name | Date |
|---|---|---|
| 2,002,372 | Greentree et al. | May 21, 1935 |
| 2,050,629 | Quereau et al. | Aug. 11, 1936 |
| 2,139,509 | Marcellus | Dec. 6, 1938 |
| 2,240,278 | Abbott | Apr. 29, 1941 |
| 2,305,264 | Leonard | Dec. 15, 1942 |
| 2,329,084 | Reason | Sept. 7, 1943 |
| 2,344,217 | Reason et al. | Mar. 14, 1944 |
| 2,345,022 | Williamson | Mar. 28, 1944 |
| 2,471,009 | Reason | May 24, 1949 |